US005244740A

United States Patent [19]

Ou et al.

[11] Patent Number: 5,244,740

[45] Date of Patent: Sep. 14, 1993

[54] WATER RESISTANT/REPELLANT VERMICULITE ARTICLES AND METHOD OF THEIR MANUFACTURE

[75] Inventors: Chia-Chih Ou, Lexington, Mass.; Deborah Neumayer, Evanston, Ill.

[73] Assignee: W.R. Grace & Co.-Conn., New York, N.Y.

[21] Appl. No.: 530,714

[22] Filed: May 30, 1990

[51] Int. Cl.$^5$ .............................................. C04B 20/06
[52] U.S. Cl. .............................. 428/446; 106/DIG. 1; 252/378 R; 427/430.1; 427/421; 428/409
[58] Field of Search ............ 252/378 R; 106/DIG. 1; 501/148, 149; 427/430.1, 421; 428/446, 409

[56] References Cited

U.S. PATENT DOCUMENTS

| | | | |
|---|---|---|---|
| 3,325,340 | 6/1987 | Walker et al. | 161/168 |
| 4,239,519 | 12/1980 | Beall et al. | 65/2 |
| 4,269,628 | 5/1981 | Ballard et al. | 106/86 |
| 4,447,491 | 5/1984 | Bradbury et al. | 428/446 |
| 4,454,237 | 6/1984 | Hoda et al. | 501/2 |
| 4,485,203 | 11/1984 | Hutchinson | 524/414 |
| 4,539,046 | 9/1985 | McAloon et al. | 252/378 R |
| 4,707,298 | 11/1987 | Tymon | 252/378 R |
| 4,715,987 | 12/1987 | Rittler | |
| 4,801,403 | 1/1989 | Lu et al. | |
| 4,812,260 | 3/1989 | Nelson | 501/148 |
| 4,826,628 | 5/1989 | Rittler | 252/378 R |
| 4,877,484 | 10/1989 | Bohrn et al. | 162/103 |
| 4,877,551 | 10/1989 | Lukacs, III | 252/378 R |
| 4,885,330 | 12/1989 | Brungardt et al. | 524/447 |
| 4,888,233 | 12/1989 | Brew | 428/446 |
| 4,915,871 | 4/1990 | Atkinson et al. | 252/387 R |
| 4,956,121 | 9/1990 | Tymon et al. | 252/378 R |

*Primary Examiner*—A. A. Turner
*Attorney, Agent, or Firm*—Nicholas P. Triano, III; John J. Wasatonic; William L. Baker

[57] ABSTRACT

A water resistant or repellant article comprised of delaminated vermiculite lamellae is provided, which article is produced by immersing the article in a solution of a cationic exchange agent.

The invention further relates to a method of producing such a water resistant or repellant article comprising the step of contacting the film with a solution of a cationic exchange agent.

22 Claims, No Drawings

WATER RESISTANT/REPELLANT VERMICULITE ARTICLES AND METHOD OF THEIR MANUFACTURE

BACKGROUND OF THE INVENTION

This invention relates to water stable vermiculite articles and the method of their manufacture. More particularly, the invention relates to water resistant or repellant vermiculite films, coatings, composites and membranes.

Vermiculite articles such as films, coatings, membranes and the like may be Prepared from vermiculite dispersions by a variety of methods. Vermiculite dispersions, and methods of their use as films, coatings, etc., are described for example in U.S. Pat. Nos. 4,655,842 and 4,780,147. Such vermiculite articles tend to be unstable when exposed to water, and most will rapidly deteriorate and even disintegrate when in contact with water.

This characteristic of these vermiculite articles is disadvantageous, and may render the article unusable in applications where the film or coating will be exposed to moisture, e.g. automotive gaskets, roofing and flooring tiles, textiles and construction products. For these and similar applications it has been desired to provide vermiculite articles which are water resistant, i.e. which are able to withstand immersion in water or prolonged exposure to moisture without significant deterioration. For applications which require non-wetting of the vermiculite article with water, such as textiles, roofing and the like, it has been desired to provide water repellant vermiculite articles, i.e. articles which will resist wetting by water and shed excess water.

It is known that water resistance may be imparted to vermiculite films by treatment with polyvalent inorganic cations. U.S. Pat. No. 3,325,340 for example discloses that the water resistance of vermiculite films may be improved by treating the films with strong electrolyte solutions (greater than 1M) containing polyvalent cations such as magnesium and aluminum. U.S. Pat. No. 4,219,609 teaches that vermiculite articles may be stabilized by exposing the article to a concentrated vapor of ammonia or an alkylamine.

However, both of the above mentioned treatments suffer disadvantages. The former requires the use of strong solutions, which are costly and may cause waste disposal problems, while the latter employs irritating and potentially toxic vapors.

It is also known that water resistance may be imparted to vermiculite films by treatment with guanidinium cations, as described in U.S. Pat. No. 4,707,298, or by treatment with diamine cations, as described in U.S. Pat. No. 4,877,551.

It is an object of the present invention to provide an alternative method of imparting water resistance and/or water repellancy to vermiculite articles, without the above mentioned disadvantages.

SUMMARY OF THE INVENTION

The present invention relates to a method of rendering water resistant or repellant a vermiculite article such as a film or coating comprised of delaminated vermiculite lamellae comprising the step of contacting the article with a solution of a cationic exchange agent. Vermiculite articles which may be rendered waterproof by the method of the invention include but are not limited to films, coatings, composites such as vermiculite-containing paper, and membranes.

The invention further relates to a water resistant or repellant article such as a film or coating comprised of delaminated vermiculite lamellae, which article is Produced by contacting the article with a solution of a cationic exchange agent.

DETAILED DESCRIPTION OF THE INVENTION

The term vermiculite as used herein refers to the group of rock forming mineral species characterized by a layer latticed structure in which the silicate layer units have a thickness of approximately 10 Angstroms. The main elements present in the layer are magnesium, aluminum, iron, silica and oxygen with the layers being separated by 1 or 2 sheets of water molecules associated with cations such as magnesium, calcium, and sodium. The layers have considerable lateral extent relative to the thickness of the basic 10 Angstroms unit layer. The term vermiculite as used herein therefore includes minerals consisting wholly or largely of vermiculite, or minerals of a mixed-layer type containing vermiculite layers as an important constituent, such as hydrobiotites, and chlorite-vermiculite, but does not include minerals of the montomorillonite group.

Vermiculite dispersions, i.e. aqueous suspensions of vermiculite lamellae, may be prepared by various methods, generally involving treating crystals of vermiculite with a cation which promotes swelling of the crystals in a direction normal to the main cleavage plane of the crystals during immersion in water, immersing the treated crystals in water so that they swell, and shearing the swollen crystals in the water to form a dispersion of delaminated vermiculite lamellae. Thus, as used herein, the term delaminated vermiculite lamellae refers to such lamellae prepared according to the above-mentioned process.

A coating of these vermiculite lamellae may be prepared by applying the dispersion to a substrate and removing the aqueous carrier, e.g. by evaporation. Self supporting films may be prepared by applying the dispersion to a substrate, removing the aqueous carrier, and then separating the coating from the substrate.

One method of preparing vermiculite dispersions, and films and coatings therefrom, is described in the above mentioned U.S. Pat. Nos. 4,655,842 and 4,780,147, the disclosures of which are incorporated herein by reference. The method of the present invention may be advantageously employed to render such films and coatings water resistant or repellant. The present invention may also be used with vermiculite articles prepared from vermiculite dispersions made by other methods, such as that taught by U.S. Pat. No. 3,325,340.

Coatings of vermiculite lamellae may be applied to a wide variety of substrates. The substrate may be in any suitable form such as an individual fiber, a sheet, a woven or non-woven mat or a block. The substrate may be a combustible material, e.g., a cellulosic fiber material or a naturally occurring or synthetic organic Polymer, or a non-combustible material such as glass, fiberglass, or metal. If the substrate is porous to the dispersion, as with most fiberglass mats, for example, the coating may derive from impregnation of the substrate.

According to the invention, the coating or film of vermiculite lamellae may be rendered water resistant or repellant by contacting the coating or film with a solution of a cationic exchange agent. The term "cationic exchange agent" as used herein refers to any exchange agent (any compound capable of exchanging interlammelar cations associated with delaminated vermiculite lamellae) comprising either (a) an organic group bonded to a cationic salt group selected from phosphonium, pyridinium, sulfonium and quaternary ammonium, or (b) an organic compound containing a single cationic amine salt group and no other amine groups. The organic group bonded to the cationic group of the exchange agents in either catagory may be a polymeric group. Included among the cationic exchange agents which may be used in the present invention are amphoteric materials (e.g. amphoteric surfactants). Specifically excluded from the cationic exchange agents of this invention are guanidinium and aminopyridinium compounds and cationic diamines. Cationic exchange agents which may be used in the invention include, but are not limited to, hexadecyltrimethylammonium, methyltriphenylphosphonium, benzyltriphenylphosphonium, and surfactants such as N,N-dimethyl-1-hexadecaneamine oxide (commercially available from Armak Chemical under the tradename Aromox ®DM-16), and N,N,N',N',N'-pentamethyl-n-tallow-1,3-propanediammonium chloride (commercially available from Armak Chemical under the co tradename Duoquad ®-T-50). Preferred cationic exchange agents include long chain ($C_{12}$–$C_{18}$) fatty amines, which provide excellent water repellancy, and amino acids, e.g. lysine. The cationic exchange agents are preferably provided in aqueous solution, for safety and low cost. However, in some cases, such as when it is desired to use a cationic exchange agent in the form of a commercially available organic surfactant, the cationic exchange agent may be provided in an organic solvent.

It is believed that these cationic exchange solutions render the coating or film water resistant/repellant by exchanging the cationic exchange agent of the solution for the interlammelar cations initially associated with the vermiculite lamellae as a result of the preparative method. Typically, the vermiculite lamellae initially contain lithium or certain ammonium cations, and during treatment with a solution of the invention some or all of these cations are exchanged with the cationic exchange agent of said solution. Thus, sterically hindered cationic exchange agents are generally not preferred, as they tend to exchange less efficiently.

The vermiculite film or coating may be contacted with the solution in various ways. Preferably, the vermiculite article is immersed in the solution. The immersion time will vary depending upon particular cationic exchange agent and the concentration of the solution. When a concentrated solution is used, less time is required to impart water resistance/repellancy, e.g. when a 0.5 Molar solution is used, the film generally requires about 10 minutes contact with the solution to develop adequate water resistance, whereas if a weak solution (e.g. 0.01M) is used, up to 24 hours immersion may be required. For a given concentration, the immersion time may be shortened by heating the solution, preferably to about 40° to 95° C. The solution may also be sprayed onto the vermiculite article, particularly when the required contact time is short.

As suggested above, a broad range of concentrations may advantageously be used in the invention. Preferred concentrations range from about 0.001M to about 1.5M, with 0.005 to 1.0M most preferred for optimal low cost and safe and easy disposal, combined with good water resistance and/or repellance of the treated film.

After treatment with a cationic exchange solution of the invention, the vermiculite article is preferably subsequently removed from the solution and rinsed with water. If desired, the vermiculite article may then be allowed to dry at room temperature, or heat-dried. The drying time and temperature will vary depending on the vermiculite article. Typically, a vermiculite film may be dried for approximately 30 minutes at 60° C.

The water resistance of the thus-treated vermiculite article may be qualitatively determined by soaking the article in water for a predetermined period of time (18 hours in deionized water is used in the examples herein), and observing the degree of water resistance of the article according to the following grading system:

Grade A: structurally intact in the room temperature water, commonly has a dark green appearance with no apparent bubbling of the film, no slightly swollen areas, no light gold areas, the film can be removed from the water and handled without tearing Grade B: structurally intact in room temperature water, may have bubbling, swollen areas, light gold areas, can be removed from the water with tweezers without tearing although may tear during handling with fingers Grade C: structurally intact in room temperature water during slight agitation, may have bubbling, swollen areas, light gold areas, tears when removed from the water with tweezers Grade D: partially dispersed in room temperature water, tears and disperses with slight agitation in the water Grade F: totally dispersed in rinse water after an overnight soak without any agitation or disperses within 10 minutes with slight agitation Grade F−: tears and/or disperses in water with slight agitation A quantitative measurement of the water resistance of a delaminated vermiculite article may also be obtained by soaking the article in water for a predetermined period of time and then testing the tensile strength of the article, with or without drying it first. Some erroneous results may be obtained using this test procedure, due to wrinkling and creasing of the vermiculite article during handling.

The following examples are illustrative of preferred embodiments of the invention and not of limiting effect. Other variations and modifications may be practiced by those skilled in the art without departing from the spirit and scope of the invention.

EXAMPLE 1

A vermiculite dispersion was prepared, using No. 4 grade vermiculite ore from Enoree, S.C. according to Example 2 of U.S. Pat. No. 4,655,842. The solids level of this dispersion was 7.5%.

A 30 mil vermiculite film was made from this dispersion, by wet drawing the film with a draw down gauge onto a granite surface. The film was allowed to dry overnight at ambient conditions, then removed from the granite and cut into 1"×5" strips. The length of the strips was parallel to the direction in which the film was drawn.

The strips were then placed in individual petri dishes and immersed in 100 ml of exchange solutions of: (a) L-histidine monohydrochloride, (b) hexadecyltrimethylammonium bromide, (c) benzyltriphenylphosphonium bromide, (d) dodecyltriphenylphosphonium bromide, (e) methyltriphenylphosphonium bromide, (f) cetylpyridinium bromide, (g) pyridine hydrobromide, and (h) pyridinium 3-nitrobenzene sulfonate having concentrations of 0.1 normal. After 18 hours the strips were removed from the solutions, rinsed 3 times with deionized water, and soaked in 100 ml of deionized water for 18 hours.

Another strip, the control, was immersed in deionized water, without prior immersion in a cationic solution.

The water resistance of the strips, according to the criteria described hereinabove, was as follows:

| Strip No. | Cationic Exchange Agent | Water Resistance |
| --- | --- | --- |
| 1 | a | Grade A |
| 2 | b | Grade A |
| 3 | c | Grade A |
| 4 | d | Grade A |
| 5 | e | Grade A |
| 6 | f | Grade A |
| 7 | g | Grade A |
| 8 | h | Grade A |
| 9 | control | Grade F |

EXAMPLE 2

The procedures of Example 1 were repeated, using as the cationic exchange agents two commercially available cationic organic surfactants, (i) Aromox DM-16 Surfactant (N,N-dimethyl-1-hexadecaneamine oxide, Armak Chemical, Chicago, Ill.), and (ii) Duoquad T-50 (N,N,N',N'-pentamethyl-n-tallow-1,3-propanediammonium chloride, Armak Chemical). Surfactant (i) was used without further dilution, at 40% concentration in ethanol, while surfactant (ii) was diluted to 5% concentration in water. Results were as follows.

| Cationic Exchange Agent | Water Resistance |
| --- | --- |
| (i) | Grade A |
| (ii) | Grade A |
| control | Grade F |

What is claimed is:

1. A method of rendering water resistant or water repellent a vermiculite article comprised of delaminated vermiculite lamellae, said article being prepared from an aqueous dispersion of said lamellae, said method comprising the step of contacting the article with a solution of an organic cationic exchange agent, with the proviso that said organic cationic exchange agent specifically excludes guanidinium and aminopyridinium compounds, and cationic diamines.

2. A method of claim 1 wherein the article is immersed in the solution.

3. A method of claim 2 further comprising the subsequent sequential steps of removing the article from the solution and drying the article.

4. A method of claim 2 wherein the article is immersed in the solution for at least ten minutes.

5. A method of claim 1 wherein the solution is sprayed onto the article.

6. A method of claim 1 wherein the concentration of the cationic exchange agent in the solution is from about 0.001M to 1.5M.

7. A method of claim 1 wherein the concentration of the cationic exchange agent in the solution is from about 0.005M to 1.0M.

8. A method of claim 1 wherein the vermiculite lamellae initially contain lithium cations and at least some of said lithium cations are exchanged with said cationic exchange agent.

9. A method of claim 1 wherein the cationic exchange agent is a long chain fatty amine or an amino acid.

10. A method of claim 1 further comprising the step of heating the solution to a temperature of from about 40° to 95° C.

11. A method of claim 1 wherein the cationic exchange agent is an organic surfactant.

12. A method of claim 1 wherein the cationic exchange agent is an amphoteric material.

13. A water resistant or water repellant vermiculite article comprised of delaminated vermicul lamellae, said article being prepared from an aqueous dispersion of said lamellae and being rendered water resistant or water repellant by contacting the article with a solution of an organic cationic exchange agent, with the proviso that said organic cationic exchange agent specifically excludes guanidinium and aminopyridinium compounds, and cationic diamines.

14. An article of claim 13 wherein the article is immersed in the solution.

15. An article of claim 14 wherein the article is immersed in the solution for at least ten minutes.

16. An article of claim 13 wherein the solution is sprayed onto the article.

17. An article of claim 13 wherein the concentration of the cationic exchange agent in the solution is from about 0.001M to 1.5M.

18. An article of claim 17 wherein the concentration of the cationic exchange agent in the solution is from about 0.005M to 1.0M.

19. An article of claim 13 wherein the vermiculite lamellae initially contain lithium cations and at least some of said lithium cations are exchanged with said cationic exchange agent.

20. An article of claim 13 wherein the cationic exchange agent is a long chain fatty amine or an amino acid.

21. An article of claim 13 wherein the cationic exchange agent solution is heated to a temperature of from about 40° to 95° C.

22. An article of claim 13 wherein the cationic exchange agent is an amphoteric material.

* * * * *